US011109277B2

(12) United States Patent
Liu

(10) Patent No.: US 11,109,277 B2
(45) Date of Patent: Aug. 31, 2021

(54) SERVICE CONFIGURATION METHOD AND RELATED PRODUCT

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/764,261

(22) PCT Filed: Nov. 20, 2017

(86) PCT No.: PCT/CN2017/111924
§ 371 (c)(1),
(2) Date: May 14, 2020

(87) PCT Pub. No.: WO2019/095381
PCT Pub. Date: May 23, 2019

(65) Prior Publication Data
US 2020/0280889 A1 Sep. 3, 2020

(51) Int. Cl.
H04W 4/00 (2018.01)
H04W 28/22 (2009.01)
H04W 88/08 (2009.01)

(52) U.S. Cl.
CPC .......... H04W 28/22 (2013.01); H04W 88/08 (2013.01)

(58) Field of Classification Search
USPC ....................................... 370/328, 329, 330
See application file for complete search history.

(56) References Cited

U.S. PATENT DOCUMENTS

2010/0322069 A1 12/2010 Song et al.
2016/0073299 A1* 3/2016 Liang .................... H04M 15/66
370/331

(Continued)

FOREIGN PATENT DOCUMENTS

CN 101998635 3/2011
CN 102137373 7/2011

(Continued)

OTHER PUBLICATIONS

3GPP, "Technical Specification Group Services and System Aspects; System Architecture for the 5G System; Stage 2," Release 15, 3GPP TS 23.501 V1.0.0, Jun. 2017. 147 pages.

(Continued)

Primary Examiner — David Q Nguyen
(74) Attorney, Agent, or Firm — Hodgson Russ LLP

(57) ABSTRACT

Disclosed in embodiments of the present application are a service configuration method and a related product, the method comprising: a core network device sending first configuration information to an access network device, the first configuration information being used to indicate one quality of service (QoS) resource type to be selected from among multiple QoS resource types, and the QoS resource type indicated by the first configuration information being used on the access network device to transmit a first service; the multiple QoS resource types comprise a guaranteed bit rate (GBR) type, non-GBR type and a delay-critical GBR type. An access network device embodied in the present application can alone determine a QoS resource type, thereby increasing service transmission efficiency.

20 Claims, 4 Drawing Sheets

(56) References Cited

U.S. PATENT DOCUMENTS

| | | | | |
|---|---|---|---|---|
| 2016/0227564 | A1* | 8/2016 | Stephenne | H04W 28/24 |
| 2017/0202004 | A1* | 7/2017 | Hurd | H04W 28/0278 |
| 2018/0192289 | A1* | 7/2018 | Dao | H04L 63/061 |
| 2019/0124015 | A1* | 4/2019 | Loehr | H04L 67/322 |
| 2020/0280871 | A1* | 9/2020 | Khirallah | H04W 28/0263 |

FOREIGN PATENT DOCUMENTS

| | | | |
|---|---|---|---|
| CN | 107005919 | | 8/2017 |
| CN | 107295575 | | 10/2017 |
| WO | 2015104280 | | 7/2015 |
| WO | WO-2019065617 A1 * | 4/2019 | H04W 28/0257 |

OTHER PUBLICATIONS

3GPP, "Technical Specification Group Radio Access Network; Evolved Universal Terrestrial Radio Access Network (E-UTRAN); S1 Application Protocol (S1AP)," Release 13, 3GPP TS 36.413 V13.1.0, Dec. 2015. 314 pages.

WIPO, ISR for PCT/CN2017/111924, dated Aug. 13, 2018.

3GPP, "Technical specification group services and system aspects; System architecture for the 5G; Stage 2.", 3GPP TS 23. 501, V 1.5.0, Release 15, Nov. 2017, 170 pages.

MediaTek Inc., "pCR 23.501 : Update of new QoS parameter, averaging window.", SA WG2 Meeting #123, S2-177503, Release 15, Oct. 23, 2017, 4 pages, Slovenia.

Ericsson, "RAN aspects on QoS parameters—discussion and decision.", 3GPP TSG-RAN WG2 #97bis, R2-1702755, Apr. 3, 2017, 7 pages, USA.

EPO, Extended European Search Report for EP Appl. No. 17932486. 8, dated Aug. 6, 2020.

CATT et al., "23.501: The usage of notification control," SA WG2 Meeting #122bis, S2-176708, (e-mail revision 1 of S2-176652), Aug. 2017, 4 pages.

Ericsson, "UE context Setup over the F1," 3GPP TSG RAN WG3 Meeting #98 Tdoc, R3-174787, Nov. 2017, 10 pages.

IPI, Office Action for IN Application No. 202017021041, dated Jun. 2, 2021.

EPO, Communication for EP Application No. 17932486.8, dated Apr. 15, 2021.

\* cited by examiner

SERVICE CONFIGURATION METHOD AND RELATED PRODUCT

CROSS-REFERENCE TO RELATED APPLICATION

This application is a U.S. national phase application of International Application No. PCT/CN2017/111924, filed Nov. 20, 2017, the entire disclosure of which is incorporated herein by reference.

TECHNICAL FIELD

The present application relates to the field of communication technologies, and more particularly, to a service configuration method and a related product.

BACKGROUND

Quality of Service (QoS) is available in both wired networks such as Ethernet and Internet Protocol Television (IPTV), and wireless networks such as Long Term Evolution (LTE), Wireless Fidelity (Wi-Fi), QoS of different networks follows different protocol specifications such as LAN/MAN Standards Committee IEEE 802, 3rd Generation Partnership Project (3GPP) and other protocol specifications, all of which are intended to ensure that users with a relative high consumption level can enjoy better services or ensure higher priority services. Taking the LTE network as an example, the LTE network can carry various services (e.g. Internet browsing, voice, online games, etc.), while different services have different characteristics and requirements (for example, different services have different sensitivity to delay, different requirements for transmission bandwidth, etc.), so the LTE network is required to be able to provide QoS applicable to different services.

There are at least three types of QoS resource types in the 5th-generation Generation (5G), which are respectively a Guaranteed Bit Rate (GBR) type, a Non-Guaranteed Bit Rate (Non-GBR) type and a delay critical Guaranteed Bit Rate (GBR) type. Services of different QoS resource types will be handled in different ways on an access network side. When a core network configures QoS resource types for the access network side, how to distinguish different QoS resource types is a technical problem being studied by those skilled in the art.

SUMMARY

The embodiments of the present application provide a service configuration method and a related product. The access network device can uniquely determine the QoS resource type, thereby improving a transmission efficiency of the service.

According to a first aspect, the embodiments of the present application provide a service configuration method, including:

sending, by a core network device, first configuration information to an access network device, the first configuration information being used to indicate one Quality of Service (QoS) resource type in a plurality of QoS resource types to be selected, and the one QoS resource type indicated by the first configuration information being used for the access network device to transmit a first service; and the plurality of QoS resource types including a Guaranteed Bit Rate (GBR) type, a Non-Guaranteed Bit Rate (Non-GBR) type and a delay critical Guaranteed Bit Rate (GBR) type.

According to a second aspect, the embodiments of the present application provide a service configuration method, including:

determining, by the access network device, the one QoS resource type according to the first configuration information.

According to a third aspect, the embodiments of the present application provide a core network device having a function of implementing behaviors of the core network device according to the first aspect above. The function may be implemented by hardware or by performing corresponding software in hardware. The hardware or software includes one or more modules corresponding to the above function. In one possible design, the core network device includes a processor configured to support the core network device to perform the corresponding function in the above method. Further, the core network device may also include a transceiver for supporting communications between the core network device and the access network device. Further, the core network device may also include a memory for coupling with the processor, and the memory stores program instructions and data necessary for the core network device.

According to a fourth aspect, the embodiments of the present application provide an access network device having a function of implementing behaviors of the access network device according to the second aspect above. The function may be implemented by hardware or by performing corresponding software in hardware. The hardware or software includes one or more modules corresponding to the above function. In one possible design, the access network device includes a processor configured to support the access network device to perform the corresponding function in the above method. Further, the access network device may also include a transceiver for supporting communications between the access network device and the core network device. Further, the access network device may also include a memory for coupling with the processor, and the memory stores program instructions and data necessary for the access network device.

According to a fifth aspect, the embodiments of the present application provide a core network device including a processor, a memory, a transceiver, and one or more programs stored in the memory and configured to be executed by the processor, where the programs include instructions for performing steps in any method according to the first aspect of the embodiments of the present application.

According to a sixth aspect, the embodiments of the present application provide an access network device including a processor, a memory, a communication interface, and one or more programs stored in the memory and configured to be executed by the processor, wherein the programs include instructions for performing steps in any method according to the second aspect of the embodiments of the present application.

According to a seventh aspect, the embodiments of the present application provide a computer readable storage medium, where the computer readable storage medium stores a computer program for service configuration, and the computer program enables a computer to perform some or all of the steps in any method according to the first aspect of the embodiments of the present application.

According to an eighth aspect, the embodiments of the present application provide a computer readable storage medium, where the computer readable storage medium stores a computer program for service configuration, and the computer program enables a computer to perform some or all of the steps in any method according to the second aspect of the embodiments of the present application.

According to a ninth aspect, the embodiments of the present application provide a computer program product, where the computer readable storage medium stores a non-transitory computer readable storage medium storing a computer program operable to enable a computer to perform some or all of the steps in any method according to the first aspect of the embodiments of the present application. The computer program product may be a software package.

According to a tenth aspect, the embodiments of the present application provide a computer program product, where the computer readable storage medium stores a non-transitory computer readable storage medium storing a computer program operable to enable a computer to perform some or all of the steps in any method according to the second aspect of the embodiments of the present application. The computer program product may be a software package.

It can be seen that in the embodiments of the present application, the core network device sends the first configuration information to the access network device, and the indication information is used to indicate one QoS resource type in the plurality of QoS resource types, so that the access network device can uniquely determine the one QoS resource type according to the first configuration information, and purposefully provide QoS for the first service according to the one QoS resource type, thereby improving the transmission efficiency of the first service.

BRIEF DESCRIPTION OF THE DRAWINGS

The drawings needed in the description of the embodiments or the related art will be introduced briefly below.

DETAILED DESCRIPTION

The technical solutions in the embodiments of the present application will be further described hereinafter in detail with reference to the drawings.

Figure 1:
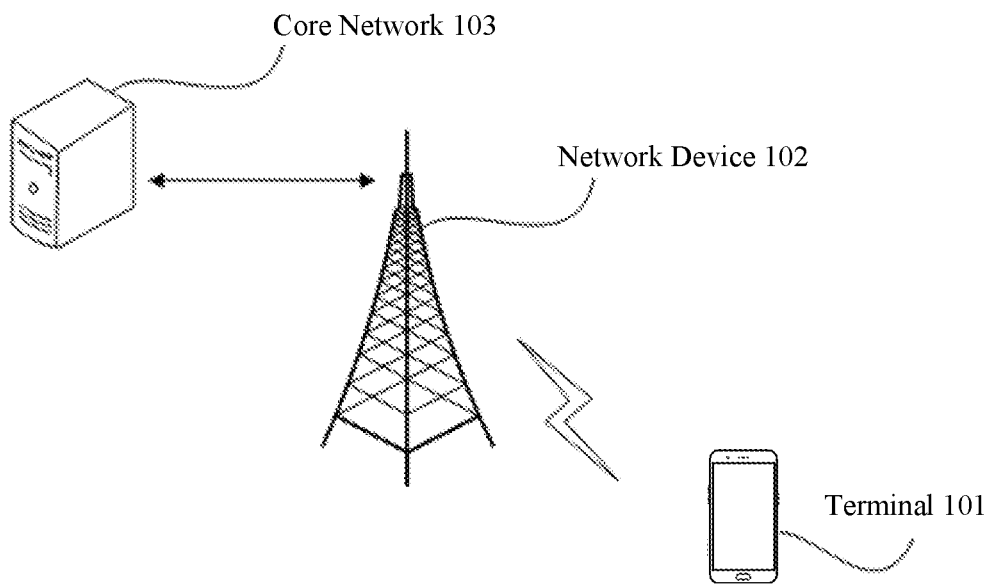
FIG. 1 is a schematic structural diagram of a wireless communication system provided by an embodiment of the present application.

Referring to FIG. 1, which is a schematic structural diagram of a wireless communication system 100 provided by an embodiment of the present application, the wireless communication system at least includes a terminal 101, an access network device 102 and a core network device 103.

Optionally, devices in the wireless communication system 10 may perform communication using wireless communication technologies, for example, the wireless communication technologies may be second generation mobile communication technology (The 2nd-Generation, 2G), The 3rd-Generation (3G), Long Term Evolution (LTE), the 4th Generation Mobile Communication (4G), the 5th-Generation (5G), or WIreless-Fidelity (WI-FI), or Bluetooth, or zigbee, or other existing communication technologies, or subsequently developed communication technologies, etc.

The terminal 101 may be a handheld device having a wireless communication function (e.g., a mobile phone, a tablet computer, a palmtop computer, etc.), a vehicle-mounted device (e.g., an automobile, a bicycle, an electric vehicle, an airplane, a ship, a train, a high-speed rail, etc.), a wearable device (e.g., a smart watch, a smart band, a pedometer, etc.), a smart home device (e.g., a refrigerator, a television, an air conditioner, an electricity meter, etc.), a flight device (e.g., an unmanned aerial vehicle, an airplane), a smart robot, a workshop device, other processing device that can be connected to a wireless modem, as well as various forms of user equipment, Mobile Station (MS), terminals, terminal equipment, and the like.

The access network device 102 (the number of which may be one or more) may be a network-side device, for example, a base station in 5G, a base station in 4G, or any other device capable of realizing a wireless network access function, etc. The access network device 102 may, be used to transmit control information or user data to the core network device 103 through a blackhaul interface (e.g., an S1 interface), for example, to configure parameters related to Quality of Service (QoS).

It should be noted that the wireless communication system 100 shown in FIG. 1 is only for the purpose of more clearly explaining the technical solutions of the present application and does not constitute a limitation to the present application. Those of ordinary skill in the art know that with the evolution of network architecture and the emergence of new service scenarios, the technical solutions provided in the present application are also applicable to similar technical problems. This application focuses on the description of the access network device 102 and the core network device 103, and the related arts involved in this application will be described below.

Figure 2:
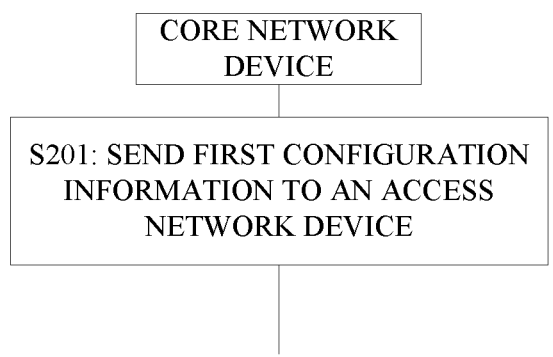
FIG. 2 is a flow chart of a service configuration method provided by an embodiment of the present application.

Referring to FIG. 2, which is a flow chart of a service configuration method provided by an embodiment of the present application, the method may be implemented based on the architecture shown in FIG. 1 or other architectures. The method includes, but is not limited to, the following steps.

In step S201, a core network device sends first configuration information to an access network device, the first configuration information being used to indicate one Quality of Service (QoS) resource type from a plurality of QoS resource types to be selected, and the one QoS resource type indicated by the first configuration information being used for the access network device to transmit a first service; and the plurality of QoS resource types including a Guaranteed Bit Rate (GBR) type, a Non-Guaranteed Bit Rate (Non-GBR) type and a delay critical Guaranteed Bit Rate (GBR) type.

Specifically, the first service here is the service currently required to be transmitted by the access network device. For example, the first service may be Internet browsing, voice, online games, etc. The QoS resource types of the QoS required by different services may be different. Therefore, when configuring the QoS used for transmitting the first service for the access network device, the core network device needs to indicate the QoS resource type of the QoS.

In the embodiments of the present application, the core network device indicates one QoS resource type in a plurality of QoS resource types to be selected through the first configuration information to serve as the QoS resource type of the QoS used when the access network device transmits the first service. In the embodiments of the present application, the plurality of QoS resource types at least include a Guaranteed Bit Rate (GBR) type, a Non-Guaranteed Bit Rate (Non-GBR) type and a delay critical Guaranteed Bit Rate (GBR) type, where the Guaranteed Bit Rate GBR type, the Non-Guaranteed Bit Rate Non-GBR type and the delay critical GBR type have the following characteristics.

Guaranteed Bit Rate (GBR) type: it is required to guarantee the rate, and it is not required that delays (of data packets) are included in the Packet Delay Budget (PDB) measurement.

Non-Guaranteed Bit Rate Non-GBR type: it is not required to guarantee the rate, and it is not required that delays (of data packets) are included in the Packet Delay Budget (PDB) measurement.

Delay critical GBR type: if the delay of the data packet exceeds the Packet Delay Budget (PDB), the data packet is lost (a packet delayed more than PDB is counted as lost).

A relationship between several different QoS resource types. QoS and services are illustrated through Table 1 below.

TABLE 1

| QoS No. | QoS resource type | Priority | Expected delay | Packet error rate | Applicable service |
|---|---|---|---|---|---|
| 1 | GBR | 20 | 100 ms | $10^{-2}$ | Voice |
| 2 | GBR | 40 | 150 ms | $10^{-3}$ | Video session |
| 3 | GBR | 30 | 50 ms | $10^{-3}$ | Real-time game |
| 5 | Non-GBR | 10 | 100 ms | $10^{-6}$ | IP multiplayer signal |
| 7 | Non-GBR | 70 | 300 ms | $10^{-3}$ | Voice, video session and real-time game |

As shown in Table 1, different QoS numbers represent different QoS, and the QoS may include parameters such as a QoS resource type, a priority, an expected delay, a packet error rate, etc. The QoS with a QoS number of 1 represents a QoS with a QoS resource type of GBR, a priority of 20, an expected delay of 100 milliseconds (ms), and a packet error rate of $10^{-2}$, and the QoS may be applicable to a voice service. The QoS with a QoS number of 2 represents a QoS with a QoS resource type of GBR, a priority of 40, an expected delay of 150 milliseconds (ms), and a packet error rate of $10^{-3}$, and the QoS may be applicable to a voice session service. A QoS with a QoS number of 3 represents a QoS with a QoS resource type of GBR, a priority of 30, an expected delay of 50 milliseconds (ms), and a packet error rate of $10^{-3}$, and the QoS may be applicable to a real-time game service. A QoS with a QoS number of other values may be analogized and no more examples will be given here.

It can be seen that the QoS resource types to which the QoS used by the different services belongs may be different. Therefore, when the access network device transmits the first service, the core network device needs to indicate the QoS resource type to which the QoS used by the access network device to transmit the first service belongs through the first configuration information, so that the access network device can provide a targeted service for the first service.

In one possible example, before the core network device sends the first configuration information to the access network device, the method further includes the following steps: the core network device generates the first configuration information according to a type table, the type table (also referred to as a 5QI information table) including an identification of each QoS resource type in the plurality of QoS resource types. In this way, the first configuration information indicating the one QoS resource type in the plurality of QoS resource types to be selected can be realized by carrying an identification of the one QoS resource type. Since the type table here includes the identification of each QoS resource type in the plurality of QoS resource types, after the access network device obtains the identification of the one QoS resource type, the one QoS resource type can be correspondingly found and determined according to a protocol.

In one possible example, the first configuration information includes description information, the description information being used to describe the one QoS resource type. In other words, the description information describes a unique characteristic of the one QoS resource type, so that the access network device can uniquely determine the one QoS resource type by interpreting the description information describing the one QoS resource type.

In one possible example, before the core network device sends the first configuration information to the access network device, the method further includes the following step: the core network device receives a request message sent by the access network device, the request message being used to request the core network device to configure the one QoS resource type for the access network device. i.e., the access network device actively requests the core network device to configure the one QoS resource type for the access network device. Optionally, the request message includes at least one of a QoS flow, a QoS rule and a QoS identification associated with the one QoS resource type, i.e., the request message indicates the one QoS resource type by including one or more of the QoS flow, the QoS rule and the QoS identification associated with the one QoS resource type, so that the core network device configures the one QoS resource type for the access network device.

Optionally, the core network device actively indicates the one QoS resource type to the access network device through the first configuration information when sending parameters related to the QoS to be used by the access network device for sending the first service to the access network device.

Subsequently, the access network device may analyze contents indicated by the first configuration information, and rules of the first configuration information may be defined in advance in the protocol; therefore, after the core network generates the first configuration information based on the protocol, the access network device may analyze the contents indicated by the first configuration information based on the protocol. In the embodiments of the present application, the access network device may analyze the one QoS resource type indicated by the first configuration information. For example, when the first configuration information indicates the one QoS resource type through the identification of the one QoS resource type, the access network device may determine the one QoS resource type according to the identification of the one QoS resource type; and when the first configuration information describes the one QoS resource type by the description information describing the one QoS resource type, the access network device may determine the one QoS resource type according to the description information describing the one QoS resource type.

In addition, the one QoS resource type indicated by the first configuration information is used for the access network device to transmit the first service, that is, the one QoS resource type may be regarded as a QoS resource type of the QoS recommended by the core network device to the access network device to transmit the first service; therefore, the access network device may subsequently transmit the first service using the QoS of the one QoS resource type, or transmit the first service without using the QoS of the one QoS resource type, and whether the QoS is used or not used needs to be determined by the access network device according to some policies, and the specific policies are not limited here. For example, when the access network device is not capable of supporting the service of the one QoS resource type, the access network device may not transmit the first service using the QoS of the one QoS resource type; and when the access network device is capable of supporting the service of the one QoS resource type, the access network device can transmit the first service using the QoS of the one QoS resource type.

In one possible example, after the core network device sends the configuration information to the access network device, the method further includes the following steps: firstly, the core network device receives feedback information sent by the access network device, the feedback information being used to indicate that the access network device does not support the one QoS resource type; and then, the core network device sends second configuration information to the access network device according to the feedback information, the second configuration information being used to indicate other QoS resource type(s) of the plurality of QoS resource types except the one QoS resource type, and the other QoS resource type(s) indicated by the second configuration information being used for the access network device to transmit the first service. It can be understood that each QoS resource type has a requirement on the QoS, such as a delay requirement, a packet error rate requirement, etc., while the access network device may not be able to meet one or more requirements required by the one QoS resource type, that is, the access network device cannot support the one QoS resource type, therefore, the access network device sends feedback information to the core network device to inform that it cannot support the one QoS resource type. Accordingly, after the core network device knows that the access network device cannot support the one QoS resource type, the core network device sends the second configuration information to the access network device to recommend other QoS resource types for the access network device, so as to recommend the access network device to transmit the first service according to QoS of the other QoS resource types.

Optionally, the feedback information is further used to indicate at least one QoS resource type supported by the access network device in the plurality of QoS resource types, and the other QoS resource types belong to the QoS resource type in the at least one QoS resource type. In other words, the access network device directly informs which QoS resource type or which QoS resource types are supported by itself through the feedback information, so that when the core network reconfigures the QoS resource type for the access network device, the core network directly selects one of the QoS resource types supported by the access network device to configure to the access network device for transmitting the first service. That is, the other QoS resource types belong to the QoS resource type in the at least one QoS resource type.

In one possible example, if the access network device does not support the one QoS resource type indicated by the first configuration information, the access network device may select a QoS of the QoS resource type supported by the access network device itself to transmit the first service.

In the method shown in FIG. 2, the core network device sends the first configuration information to the access network device, the indication information being used to indicate one QoS resource type in the plurality of QoS resource types, so that the access network device can uniquely determine the one QoS resource type according to the first configuration information, and targetedly provide QoS for the first service according to the one QoS resource type, thereby improving the transmission efficiency of the first service.

Figure 3:
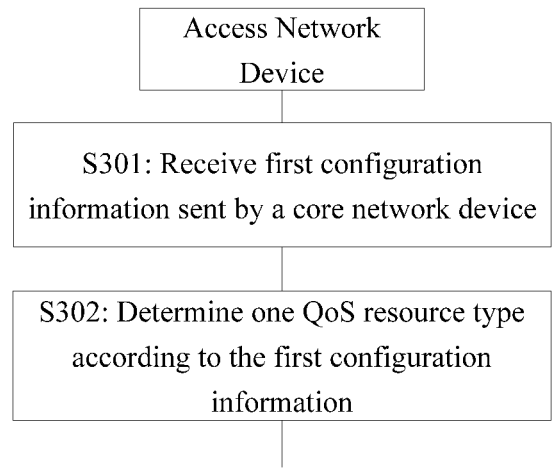
FIG. 3 is a flow chart of another service configuration method provided by an embodiment of the present application.

Consistent with the above embodiment shown in FIG. 2, please refer to FIG. 3, which illustrates another service configuration method provided by an embodiment of the present application. The method may be implemented based on the architecture shown in FIG. 1 or other architectures. The method includes but is not limited to the following steps.

In step S301, an access network device receives first configuration information sent by a core network device, the first configuration information being used to indicate one Quality of Service (QoS) resource type from a plurality of QoS resource types to be selected, and the one QoS resource type indicated by the first configuration information being used for the access network device to transmit a first service; and the plurality of QoS resource types including a Guaranteed Bit Rate (GBR) type, a Non-Guaranteed Bit Rate (Non-GBR) type and a delay critical Guaranteed Bit Rate (GBR) type.

Specifically, the first service here is the service currently required to be transmitted by the access network device. For example, the first service may be Internet browsing, voice, online games, etc. The QoS resource types of the QoS required by different services may be different. Therefore, when configuring the QoS used for transmitting the first service for the access network device, the core network device needs to indicate the QoS resource type of the QoS.

In the embodiments of the present application, the core network device indicates one QoS resource type in a plurality of QoS resource types to be selected through the first configuration information to serve as the QoS resource type of the QoS used when the access network device transmits the first service. In the embodiments of the present application, the plurality of QoS resource types at least include a Guaranteed Bit Rate (GBR) type, a Non-Guaranteed Bit Rate (Non-GBR) type and a delay critical Guaranteed Bit Rate (GBR) type, where each QoS type in the plurality of QoS resource types is introduced as follows.

Guaranteed Bit Rate (GBR) type: it is required to guarantee the rate, and it is not required that delays (of data packets) are included in the Packet Delay Budget (PDB) measurement.

Non-Guaranteed Bit Rate Non-GBR type: it is not required to guarantee the rate, and it is not required that delays (of data packets) are included in the Packet Delay Budget (PDB) measurement.

Delay critical GBR type: if the delay of the data packet exceeds the Packet Delay Budget (PDB), the data packet is lost (a packet delayed more than PDB is counted as lost).

A relationship between several different QoS resource types, QoS and services are illustrated through Table 1 below.

TABLE 1

| QoS No. | QoS resource type | Priority | Expected delay | Packet error rate | Applicable service |
|---|---|---|---|---|---|
| 1 | GBR | 20 | 100 ms | $10^{-2}$ | Voice |
| 2 | GBR | 40 | 150 ms | $10^{-3}$ | Video session |
| 3 | GBR | 30 | 50 ms | $10^{-3}$ | Real-time game |
| 5 | Non-GBR | 10 | 100 ms | $10^{-6}$ | IP multiplayer signal |
| 7 | Non-GBR | 70 | 300 ms | $10^{-3}$ | Voice, video session and real-time game |

As shown in Table 1, different QoS numbers represent different QoS, and the QoS may include parameters such as a QoS resource type, a priority, an expected delay, a packet error rate, etc. A QoS with a QoS number of 1 represents a QoS with a QoS resource type of GBR, a priority of 20, an expected delay of 100 milliseconds (ms), and a packet error rate of $10^{-2}$, and the QoS may be applicable to a voice service. A QoS with a QoS number of 2 represents a QoS with a QoS resource type of GBR, a priority of 40, an expected delay of 150 milliseconds (ms), and a packet error rate of $10^{-3}$, and the QoS may be applicable to a voice session service. A QoS with a QoS number of 3 represents a QoS with a QoS resource type of GBR, a priority of 30, an expected delay of 50 milliseconds (ms), and a packet error rate of $10^{-3}$, and the QoS may be applicable to a real-time game service. A QoS with a QoS number of other values can be analogized and no more examples will be given here.

It can be seen that the QoS resource types to which the QoS used by the different services belongs may be different. Therefore, when the access network device transmits the first service, the core network device needs to indicate the QoS resource type to which the QoS used by the access network device to transmit the first service belongs through the first configuration information, so that the access network device can provide a targeted service for the first service.

In one possible example, before the core network device sends the first configuration information to the access network device, the method further includes the following step: the core network device generates the first configuration information according to a type table, the type table (also referred to as a 5QI information table) including an identification of each QoS resource type in the plurality of QoS resource types. In this way, the first configuration information indicating the one QoS resource type in the plurality of QoS resource types to be selected can be realized by carrying an identification of the one QoS resource type. Accordingly, the access network device determining the one QoS resource type according to the first configuration information may specifically include: firstly, determining that the first configuration information includes an identification of the one QoS resource type, each QoS resource type in the plurality of QoS resource types having a respective identification; and then, determining the one QoS resource type according to the identification of the one QoS resource type.

In one possible example, the first configuration information includes description information, the description information being used to describe the one QoS resource type. In other words, the description information describes a unique characteristic of the one QoS resource type, so that the access network device can uniquely determine the one QoS resource type by interpreting the description information describing the one QoS resource type.

In one possible example, before the access network device receives the first configuration information sent by the core network device, the method further includes the following step: the access network device sends a request message to the core network device, the request message including at least one of a QoS flow, a QoS rule and a QoS identification associated with the one QoS resource type, and the request message being used to request the core network device to configure the one QoS resource type for the access network device, i.e., the access network device actively requesting the core network device to configure the one QoS resource type for the access network device. Optionally, the request message includes at least one of a QoS flow, a QoS rule and a QoS identification associated with the one QoS resource type. i.e., the request message indicates the one QoS resource type by including one or more of the QoS flow, the QoS rule and the QoS identification associated with the one QoS resource type, so that the core network device configures the one QoS resource type for the access network device.

Optionally, the core network device actively indicates the one QoS resource type to the access network device through the first configuration information when sending to the access network device the parameter related to the QoS to be used by the access network device for sending the first service.

In step S302, the access network device determines the one QoS resource type according to the first configuration information.

Specifically, the access network device may analyze contents indicated by the first configuration information, and a rule of the first configuration information may be defined in advance in the protocol; therefore, after the core network generates the first configuration information based on the protocol, the access network device may analyze the contents indicated by the first configuration information based on the protocol. In the embodiments of the present application, the access network device may analyze the one QoS resource type indicated by the first configuration information. For example, when the first configuration information indicates the one QoS resource type through the identification of the one QoS resource type, the access network device can determine the one QoS resource type according to the identification of the one QoS resource type; and when the first configuration information describes the one QoS resource type by the description information describing the one QoS resource type, the access network device can determine the one QoS resource type according to the description information describing the one QoS resource type.

In addition, the one QoS resource type indicated by the first configuration information is used for the access network device to transmit the first service, that is, the one QoS resource type may be regarded as a QoS resource type of the QoS recommended by the core network device to the access network device for transmitting the first service; therefore, the access network device may subsequently transmit the first service using the QoS of the one QoS resource type, or not transmit the first service using the QoS of the one QoS resource type, and whether the QoS is used or not used needs to be determined by the access network device according to some policies specifically, and the specific policies are not limited here. For example, when the access network device is not capable of supporting the service of the one QoS resource type, the access network device may not transmit the first service using the QoS of the one QoS resource type; and when the access network device is capable of supporting the service of the one QoS resource type, the access network device can transmit the first service using the QoS of the one QoS resource type.

In one possible example, after the access network device determines the one QoS resource type according to the first configuration information, the method further includes the following steps: firstly, the access network device sends feedback information to the core network device, the feedback information being used to indicate that the access network device does not support the one QoS resource type; then, the access network device receives second configuration information sent by the core network device, the second configuration information being used to indicate other QoS resource types of the plurality of QoS resource types except the one QoS resource type, and the other QoS resource types being recommended to the access network device to transmit the first service; and next, the access network device determines the other QoS resource types according to the second configuration information. It can be understood that since each QoS resource type has a requirement on the QoS, such as a delay requirement, a packet error rate requirement, etc., while the access network device may not be able to meet one or more requirements required by the one QoS resource type, that is, the access network device cannot support the one QoS resource type, the access network device sends feedback information to the core network device to inform that it cannot support the one QoS resource type. Accordingly, after the core network device knows that the access network device cannot support the one QoS resource type, the core network device sends second configuration information to the access network device to recommend other QoS resource types for the access network device, so as to recommend the access network device to transmit the first service according to QoS of the other QoS resource types.

Optionally, the feedback information is further used to indicate at least one QoS resource type supported by the access network device in the plurality of QoS resource types; and the other QoS resource types belong to the QoS resource type in the at least one QoS resource type. In other words, the access network device directly informs which QoS resource type or which QoS types are supported by itself through the feedback information, so that when the core network reconfigures the QoS resource type for the access network device, the core network directly selects one of the QoS resource types supported by the access network device to configure to the access network device to transmit the first service. That is, the other QoS resource types belong to the QoS resource type in the at least one QoS resource type.

In one possible example, if the access network device does not support the one QoS resource type indicated by the first configuration information, the access network device may select a QoS of the QoS resource type supported by the access network device to transmit the first service.

In the method shown in FIG. 3, the core network device sends the first configuration information to the access network device, the indication information being used to indicate one QoS resource type in the plurality of QoS resource types, so that the access network device can uniquely determine the one QoS resource type according to the first configuration information, and targetedly provide QoS for the first service according to the one QoS resource type, thereby improving the transmission efficiency of the first service.

Figure 4:
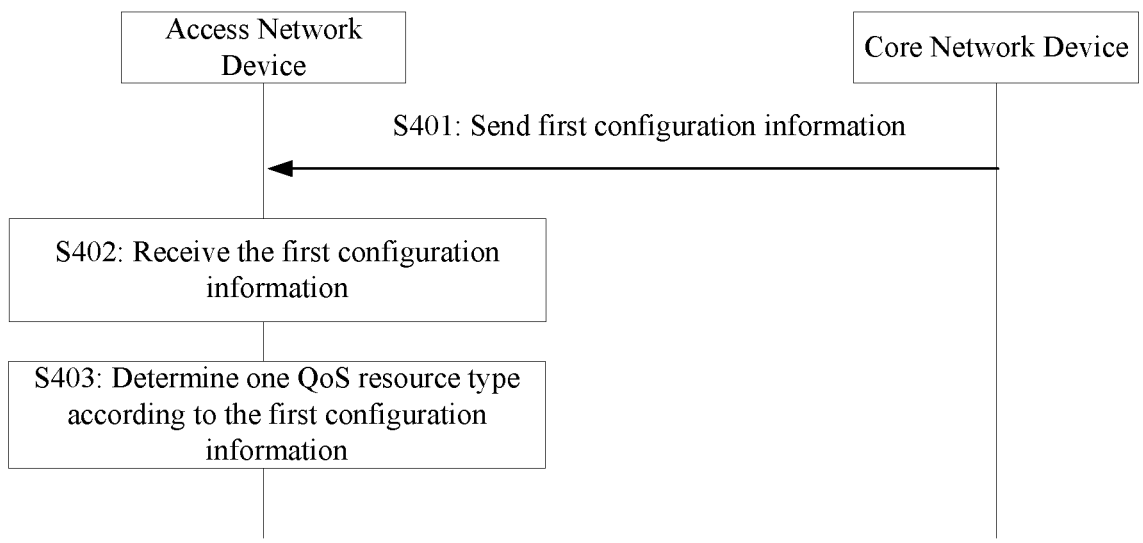
FIG. 4 is a flow chart of another service configuration method provided by an embodiment of the present application.

Consistent with the embodiment shown in FIG. 2, please refer to FIG. 4, which illustrates another service configuration method provided by an embodiment of the present application. The method can be implemented based on the architecture shown in FIG. 1 or other architectures. The method includes but is not limited to the following steps.

In step S401, a core network device sends first configuration information to an access network device, the first configuration information being used to indicate one Quality of Service (QoS) resource type from a plurality of QoS resource types to be selected, and the one QoS resource type indicated by the first configuration information being used for the access network device to transmit a first service; and the plurality of QoS resource types including a Guaranteed Bit Rate (GBR) type, a Non-Guaranteed Bit Rate (Non-GBR) type and a delay critical Guaranteed Bit Rate (GBR) type.

Specifically, the first service here is the service currently required to be transmitted by the access network device. For example, the first service may be Internet browsing, voice, online games, etc. The QoS resource types of the QoS required by different services may be different. Therefore, when configuring the QoS used for transmitting the access network device, the core network device needs to indicate the QoS resource type of the QoS.

In the embodiment of the present application, the core network device indicates one QoS resource type in a plurality of QoS resource types to be selected through the first configuration information to serve as the QoS resource type of the QoS used when the access network device transmits the first service. In the embodiment of the present application, the plurality of QoS resource types at least include a Guaranteed Bit Rate (GBR) type, a Non-Guaranteed Bit Rate (Non-GBR) type and a delay critical Guaranteed Bit Rate (GBR) type, where each QoS type in the plurality of QoS resource types is introduced as follows:

Guaranteed Bit Rate (GBR) type: it is required to guarantee the rate, and it is not required that delays (of data packets) are included in the Packet Delay Budget (PDB) measurement.

Non-Guaranteed Bit Rate Non-GBR type: it is not required to guarantee the rate, and it is not required that delays (of data packets) are included in the Packet Delay Budget (PDB) measurement.

Delay critical GBR type: if the delay of the data packet exceeds the Packet Delay Budget (PDB), the data packet is lost (a packet delayed more than PDB is counted as lost).

A relationship between several different QoS resource types, QoS and services are illustrated through Table 1 below.

TABLE 1

| QoS No. | QoS resource type | Priority | Expected delay | Packet error rate | Applicable service |
|---|---|---|---|---|---|
| 1 | GBR | 20 | 100 ms | $10^{-2}$ | Voice |
| 2 | GBR | 40 | 150 ms | $10^{-3}$ | Video session |
| 3 | GBR | 30 | 50 ms | $10^{-3}$ | Real-time game |
| 5 | Non-GBR | 10 | 100 ms | $10^{-6}$ | IP multiplayer signal |
| 7 | Non-GBR | 70 | 300 ms | $10^{-3}$ | Voice, video session and real-time game |

As shown in Table 1, different QoS numbers represent different QoS, and the QoS may include parameters such as a QoS resource type, a priority, an expected delay, a packet error rate, etc. A QoS with a QoS number of 1 represents a QoS with a QoS resource type of GBR, a priority of 20, an expected delay of 100 milliseconds (ms), and a packet error rate of $10^{-2}$, and the QoS may be applicable to a voice service. A QoS with a QoS number of 2 represents a QoS with a QoS resource type of GBR, a priority of 40, an expected delay of 150 milliseconds (ms), and a packet error rate of $10^{-3}$, and the QoS may be applicable to a voice session service. A QoS with a QoS number of 3 represents a QoS with a QoS resource type of GBR, a priority of 30, an expected delay of 50 milliseconds (ms), and a packet error rate of $10^{-3}$, and the QoS may be applicable to a real-time game service. A QoS with a QoS number of other values can be analogized and no more examples will be given here.

It can be seen that the QoS resource types to which the QoS used by the different services belongs may be different. Therefore, when the access network device transmits the first service, the core network device needs to indicate the QoS resource type to which the QoS used by the access network device to transmit the first service belongs through the first configuration information, so that the access network device can provide a targeted service for the first service.

In one possible example, before the core network device sends the first configuration information to the access network device, the method further includes the following step: the core network device generates the first configuration information according to a type table, the type table (also referred to as a 5QI information table) including an identification of each QoS resource type in the plurality of QoS resource types. In this way, the first configuration information indicating the one QoS resource type in the plurality of QoS resource types to be selected can be realized by carrying an identification of the one QoS resource type. Since the type table here includes the identification of each QoS resource type in the plurality of QoS resource types, after the access network device obtains the identification of the one QoS resource type, the one QoS resource type can be correspondingly found and determined according to a protocol.

In one possible example, the first configuration information includes description information, the description information being used to describe the one QoS resource type. In other words, the description information describes a unique characteristic of the one QoS resource type, so that the access network device can uniquely determine the one QoS resource type by interpreting the description information describing the one QoS resource type.

In one possible example, before the core network device sends the first configuration information to the access network device, the method further includes the following step: the core network device receives a request message sent by the access network device, the request message being used to request the core network device to configure the one QoS resource type for the access network device. i.e., the access network device actively requests the core network device to configure the one QoS resource type for the access network device. Optionally, the request message includes at least one of a QoS flow, a QoS rule and a QoS identification associated with the one QoS resource type, i.e., the request message indicates the one QoS resource type by including one or more of the QoS flow, the QoS rule and the QoS identification associated with the one QoS resource type, so that the core network device configures the one QoS resource type for the access network device.

Optionally, the core network device actively indicates the one QoS resource type to the access network device through the first configuration information when sending to the access network device a parameter related to the QoS to be used by the access network device for sending the first service.

In step S402, the access network device receives the first configuration information sent by the core network device.

In step S403, the access network device determines the one QoS resource type according to the first configuration information.

Specifically, the access network device will analyze contents indicated by the first configuration information, and a rule of the first configuration information can be defined in advance in the protocol; therefore, after the core network generates the first configuration information based on the protocol, the access network device can analyze the contents indicated by the first configuration information based on the protocol. In the embodiment of the present application, the access network device may analyze the one QoS resource type indicated by the first configuration information. For example, when the first configuration information indicates the one QoS resource type through the identification of the one QoS resource type, the access network device can determine the one QoS resource type according to the identification of the one QoS resource type; and when the first configuration information describes the QoS resource type by the description information describing the one QoS resource type, the access network device can determine the one QoS resource type according to the description information describing the one QoS resource type.

In addition, the one QoS resource type indicated by the first configuration information is used for the access network device to transmit the first service, that is, the one QoS resource type may be regarded as a QoS resource type of the QoS recommended by the core network device to the access network device for transmitting the first service; therefore, the access network device may subsequently transmit the first service using the QoS of the one QoS resource type, or does not transmit the first service using the QoS of the one QoS resource type, and whether the QoS is used or not used needs to be determined by the access network device according to some policies specifically, and the specific policies are not limited here. For example, when the access network device is not capable of supporting the service of the one QoS resource type, the access network device may not transmit the first service using the QoS of the one QoS resource type; and when the access network device is capable of supporting the service of the one QoS resource type, the access network device can transmit the first service using the QoS of the one QoS resource type.

In one possible example, after the access network device determines the one QoS resource type according to the first configuration information, the method may further include the following steps: firstly, the access network device sends feedback information to the core network device, the feedback information being used to indicate that the access network device does not support the one QoS resource type; then, the access network device receives second configuration information sent by the core network device, the second configuration information being used to indicate other QoS resource types of the plurality of QoS resource types except the one QoS resource type, and the other QoS resource types indicated by the second configuration information being recommended to the access network device for transmitting the first service; and next, the access network device determines the other QoS resource types according to the second configuration information. It can be understood that since each QoS resource type has a requirement on the QoS, such as a delay requirement, a packet error rate requirement, etc., while the access network device may not be able to meet one or more requirements required by the one QoS resource type, that is, the access network device cannot support the one QoS resource type, the access network device sends feedback information to the core network device to inform that it cannot support the one QoS resource type. Accordingly, after the core network device knows that the access network device cannot support the one QoS resource type, the core network device sends second configuration information to the access network device to recommend other QoS resource types for the access network device, so as to recommend the access network device to transmit the first service according to QoS of the other QoS resource types.

Optionally, the feedback information is further used to indicate at least one QoS resource type supported by the access network device in the plurality of QoS resource types; and the other QoS resource types belong to the QoS resource type in the at least one QoS resource type. In other words, the access network device directly informs which QoS resource type or which QoS types is supported by itself through the feedback information, so that when the core network reconfigures the QoS resource type for the access network device, the core network directly selects one of the QoS resource types supported by the access network device to configure to the access network device for transmitting the first service. That is, the other QoS resource types belong to the QoS resource type in the at least one QoS resource type.

In one possible example, if the access network device does not support the one QoS resource type indicated by the first configuration information, the access network device may select a QoS of the QoS resource type supported by the access network device to transmit the first service.

In the method shown in FIG. 4, the core network device sends the first configuration information to the access network device, and the indication information is used to indicate one QoS resource type in the plurality of QoS resource types, so that the access network device can uniquely determine the one QoS resource type according to the first configuration information, and targetedly provide QoS for the first service according to the one QoS resource type, thereby improving the transmission efficiency of the first service.

Figure 5:
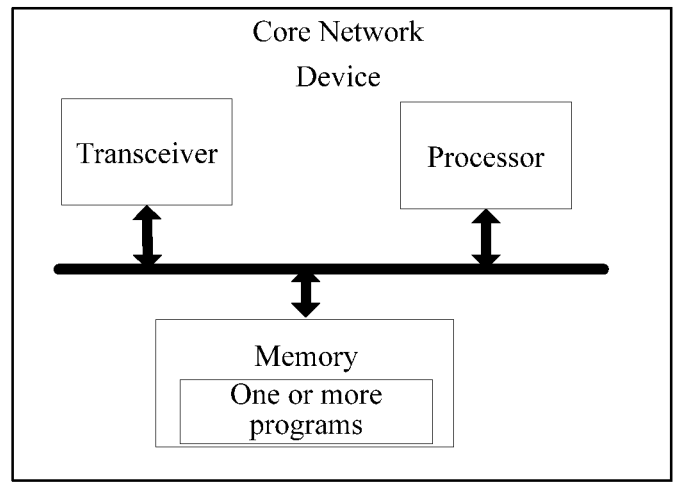
FIG. 5 is a schematic structure diagram of a core network device provided by an embodiment of the present application.

Consistent with the above embodiments, please refer to FIG. 5, which is a schematic structure diagram of a core network device provided by an embodiment of the present application. The core network device is a first core network device. As shown in the figure, the core network device includes a processor, a memory, a transceiver, and one or more programs stored in the memory and configured to be executed by the processor, where the programs include instructions for performing the following step:

sending first configuration information to an access network device, the first configuration information being used to indicate one Quality of Service (QoS) resource type in a plurality of QoS resource types to be selected, and the one QoS resource type indicated by the first configuration information being used for the access network device to transmit a first service; and the plurality of QoS resource types including a Guaranteed Bit Rate (GBR) type, a Non-Guaranteed Bit Rate (Non-GBR) type and a delay critical Guaranteed Bit Rate (GBR) type.

It can be seen that in the embodiment of the present application, the core network device sends the first configuration information to the access network device, and the indication information is used to indicate one QoS resource type in the plurality of QoS resource types, so that the access network device can uniquely determine the one QoS resource type according to the first configuration information, and targetedly provide QoS for the first service according to the one QoS resource type, thereby improving the transmission efficiency of the first service.

In one possible example, before sending the first configuration information to the access network device, the method further includes: generating the first configuration information according to a type table, the type table including an identification of each QoS resource type in the plurality of QoS resource types, and the first configuration information indicating the one QoS resource type by carrying an identification of the one QoS resource type.

In one possible example, the first configuration information includes description information, the description information being used to describe the one QoS resource type.

In one possible example, after sending the configuration information to the access network device, the method further includes: firstly, receiving feedback information sent by the access network device, the feedback information being used to indicate that the access network device does not support the one QoS resource type; and then, sending second configuration information to the access network device according to the feedback information, the second configuration information being used to indicate other QoS resource types in the plurality of QoS resource types except the one QoS resource type, and the other QoS resource types indicated by the second configuration information being used for the access network device to transmit the first service.

In one possible example, the feedback information is further used to indicate at least one QoS resource type supported by the access network device in the plurality of QoS resource types; and the other QoS resource types belong to the QoS resource type in the at least one QoS resource type.

In one possible example, before sending the first configuration information to the access network device, the method further includes: receiving a request message sent by the access network device, the request message including at least one of a QoS flow, a QoS rule and a QoS identification associated with the one QoS resource type, and the request message being used to request the core network device to configure the one QoS resource type for the access network device.

The specific implementation of the above steps may also be described with reference to the method embodiments shown in FIGS. 2 to 4.

Figure 6:
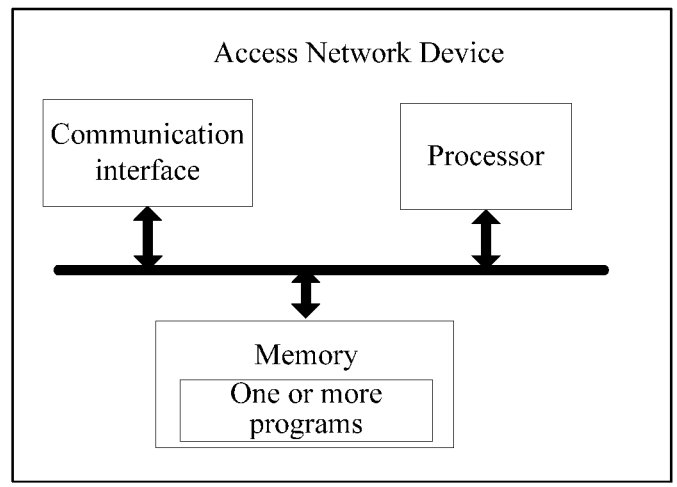
FIG. 6 is a schematic structure diagram of an access network device provided by an embodiment of the present application.

Consistent with the above embodiments, please refer to FIG. 6, which is a schematic structure diagram of an access network device provided by an embodiment of the present application. As shown in the figure, the access network device includes a processor, a memory, a communications interface, and one or more programs stored in the memory and configured to be executed by the processor, where the programs include instructions for performing the following steps:

firstly, receiving first configuration information sent by a core network device, the first configuration information being used to indicate one Quality of Service (QoS) resource type in a plurality of QoS resource types to be selected, the one QoS resource type being recommended to the access network device to transmit a first service, and the plurality of QoS resource types including a Guaranteed Bit Rate (GBR) type, a Non-Guaranteed Bit Rate (Non-GBR) type and a delay critical Guaranteed Bit Rate (GBR) type; and then, determining the one QoS resource type according to the first configuration information.

It can be seen that in the embodiment of the present application, the core network device sends the first configuration information to the access network device, and the indication information is used to indicate one QoS resource type in the plurality of QoS resource types, so that the access network device can uniquely determine the one QoS resource type according to the first configuration information, and targetedly provide QoS for the first service according to the one QoS resource type, thereby improving the transmission efficiency of the first service.

In one possible example, the determining the one QoS resource type according to the first configuration information includes: firstly, determining that the first configuration information includes an identification of the one QoS resource type, and each QoS resource type in the plurality of QoS resource types has a respective identification; and then, determining the one QoS resource type according to the identification of the one QoS resource type.

In one possible example, the first configuration information includes description information, the description information being used to describe the one QoS resource type.

In one possible example, after determining the one QoS resource type according to the first configuration information, the method further includes: firstly, sending feedback information to the core network device, the feedback information being used to indicate that the access network device does not support the one QoS resource type; then, receiving second configuration information sent by the core network device, the second configuration information being used to indicate other QoS resource types in the plurality of QoS resource types except the one QoS resource type, and the other QoS resource types being recommended to the access network device to transmit the first service; and next, determining the other QoS resource types according to the second configuration information.

In one possible example, the feedback information is further used to indicate at least one QoS resource type supported by the access network device in the plurality of QoS resource types; and the other QoS resource types belong to the QoS resource type in the at least one QoS resource type.

In one possible example, before receiving the first configuration information sent by the core network device, the method further includes: sending a request message to the core network device, the request message including at least one of a QoS flow, a QoS rule and a QoS identification associated with the one QoS resource type, and the request message being used to request the core network device to configure the one QoS resource type for the access network device.

The specific implementation of the above steps may also be described with reference to the method embodiments shown in FIGS. 2 to 4.

The above mainly introduces the solutions of the embodiments of the present application from the perspective of interaction between various network elements. It can be understood that, in order to realize the above-mentioned functions, the access network device and the core network device include corresponding hardware structures and/or software modules for performing various functions. Those skilled in the art may be easily aware that, in combination with the exemplary units and algorithm steps described in the embodiments disclosed herein, the present application can be implemented by hardware or a combination of hardware and computer software. Whether certain functions are executed by hardware or hardware driven by computer software depends on particular applications and design constraint conditions of the technical solutions. Professionals may use different methods to implement the described functions for each particular application, but it should not be deemed that the implementation goes beyond the scope of the present application.

The embodiments of the present application may divide function units for the access network device and the core network device according to the above method examples, for example, each function unit may be divided corresponding to each function, or two or more functions may be integrated into one processing unit. The integrated units above may either be implemented in the form of hardware, or in the form of software program modules. It should be noted that the division of units in the embodiments of the present application is schematic and is only a logical function division, and there may be other division modes in actual implementation.

Figure 7:
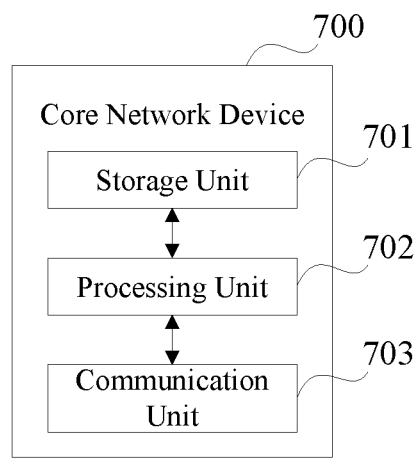
FIG. 7 is a schematic structure diagram of another access network device provided by an embodiment of the present application.

In the case of using the integrated units, FIG. 7 illustrates a block diagram of a possible function unit composition of the core network device involved in the above embodiments. A core network device 700 includes a processing unit 702 and a communication unit 703. The processing unit 702 is configured to control and manage actions of the core network device. For example, the processing unit 702 is configured to control the communication unit 703 to execute step S201 in FIG. 2 and step 401 in FIG. 4, and/or other processes for the technologies described herein. The core network device may further include a storage unit 701 for storing program codes and data of the core network device.

The processing unit 702 may be a processor or a controller, the communication unit 703 may be a transceiver, a transceiver circuit, a radio frequency chip, etc., and the storage unit 701 may be a memory.

The processing unit 702 is configured to send first configuration information to the access network device through the communication unit 703, the first configuration information being used to indicate one Quality of Service (QoS) resource type in a plurality of QoS resource types to be selected, and the one QoS resource type indicated by the first configuration information being used for the access network device to transmit a first service, and the plurality of QoS resource types including a Guaranteed Bit Rate (GBR) type, a Non-Guaranteed Bit Rate (Non-GBR) type and a delay critical Guaranteed Bit Rate (GBR) type.

In one possible example, before the processing unit 702 sends the first configuration information to the access network device through the communication unit 703, the processing unit 702 is further configured to generate the first configuration information according to a type table, the type table including an identification of each QoS resource type in the plurality of QoS resource types, and the first configuration information indicating the one QoS resource type by carrying an identification of the one QoS resource type.

In one possible example, the first configuration information includes description information, the description information being used to describe the one QoS resource type.

In one possible example, after the processing unit 702 sends the configuration information to the access network device through the communication unit 703, the processing unit 702 is further configured to;

receive feedback information sent by the access network device through the communication unit 703, the feedback information being used to indicate that the access network device does not support the one QoS resource type; and send second configuration information to the access network device according to the feedback information through the communication unit 703, the second configuration information being used to indicate other QoS resource types of the plurality of QoS resource types except the one QoS resource type, and the other QoS resource types indicated by the second configuration information being used for the access network device to transmit the first service.

In one possible example, the feedback information is further used to indicate at least one QoS resource type in the plurality of QoS resource types supported by the access network device; and the other QoS resource types belong to the QoS resource type in the at least one QoS resource type.

In one possible example, before the processing unit 702 sends the first configuration information to the access network device through the communication unit 703, the processing unit 702 is further configured to receive a request message sent by the access network device through the communication unit 703, the request message including at least one of a QoS flow, a QoS rule and a QoS identification associated with the one QoS resource type, and the request message being used to request the core network device to configure the one QoS resource type for the access network device.

When the processing unit 702 is a processor, the communication unit 703 is a communications interface, and the storage unit 701 is a memory, the core network device involved in the embodiments of the present application may be the core network device shown in FIG. 5.

Figure 8:
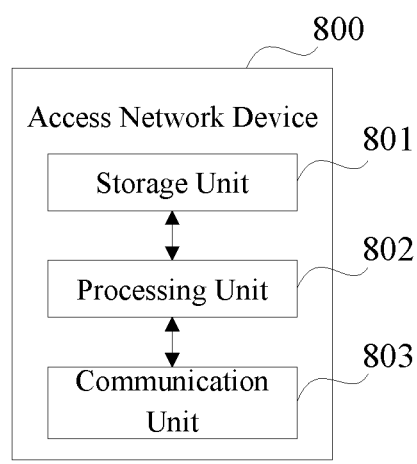
FIG. 8 is a schematic structure diagram of another access network device provided by an embodiment of the present application.

In the case of using the integrated units, FIG. 8 illustrates a block diagram of a possible function unit composition of the access network device involved in the above embodiments. The access network device 800 includes a processing unit 802 and a communication unit 803. The processing unit 802 is configured to control and manage actions of the access network device. For example, the processing unit 802 is configured to control the communication unit 803 to execute step 401 in FIG. 3 and step 402 in FIG. 4, and/or other processes for the technologies described herein. The access network device may further include a storage unit 801 for storing program codes and data of the access network device.

The processing unit 802 may be a processor or a controller, for example, a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware device or any combination thereof. The processing unit may implement or execute various exemplary logical blocks, modules, and circuits described in connection with the present application. The processor may also be a combination that implements computing functions, such as a combination that includes one or more microprocessors, a combination of DSP and microprocessors, and the like. The communication unit 803 may be a transceiver, a transceiver circuit, etc., and the storage unit 801 may be a memory.

The processing unit 802 is configured to receive first configuration information sent by the core network device through the communication unit 803, the first configuration information being used to indicate one Quality of Service (QoS) resource type from a plurality of QoS resource types to be selected, the one QoS resource type being recommended to the access network device to transmit a first service, and the plurality of QoS resource types including a Guaranteed Bit Rate (GBR) type, a Non-Guaranteed Bit Rate (Non-GBR) type and a delay critical Guaranteed Bit Rate (GBR) type; and the processing unit 802 is further configured to determine the one QoS resource type according to the first configuration information.

In one possible example, the processor 802 determining the one QoS resource type according to the first configuration information particularly includes: firstly, determining that the first configuration information includes an identification of the one QoS resource type, and each QoS resource type in the plurality of QoS resource types has a respective identification; and then, determining the one QoS resource type according to the identification of the one QoS resource type.

In one possible example, the first configuration information includes description information, the description information being used to describe the one QoS resource type.

In one possible example, after the processor 802 determines the one QoS resource type according to the first configuration information:

the processing unit 802 is further configured to send feedback information to the core network device through the communication unit 803, the feedback information being used to indicate that the access network device does not support the one QoS resource type;

the processing unit 802 is further configured to receive second configuration information sent by the core network device through the communication unit 803, the second configuration information being used to indicate other QoS resource types of the plurality of QoS resource types except the one QoS resource type, and the other QoS resource types indicated by the second configuration information being used for the access network device to transmit the first service; and the processing unit 802 is further configured to determine the other QoS resource types according to the second configuration information.

In one possible example, the feedback information is further used to indicate at least one QoS resource type in the plurality of QoS resource types supported by the access network device; and the other QoS resource types belong to the QoS resource type in the at least one QoS resource type.

In one possible example, before receiving the first configuration information sent by the core network device through the communication unit 803, the processing unit 802 is further configured to send a request message to the core network device through the communication unit 803, the request message including at least one of a QoS flow, a QoS rule and a QoS identification associated with the one QoS resource type, and the request message being used to request the core network device to configure the one QoS resource type for the access network device.

When the processing unit 802 is a processor, the communication unit 803 is a communication interface, and the storage unit 801 is a memory, the access network device involved in the embodiments of the present application may be the access network device shown in FIG. 6.

The embodiments of the present application further provide a computer readable storage medium, where the computer readable storage medium stores a computer program for electronic data exchange, and the computer program enables a computer to perform some or all of the steps described by the access network device in the above method embodiments.

The embodiments of the present application further provide a computer readable storage medium, where the computer readable storage medium stores a computer program for electronic data exchange, and the computer program enables a computer to perform some or all of the steps described by the core network device in the above method embodiments.

The embodiments of the present application further provide a computer program product, where the computer program product includes a non-transitory computer readable storage medium storing a computer program operable to enable a computer to perform some or all of the steps described by the access network device in the above method embodiments. The computer program product may be a software package.

The embodiments of the present application further provide a computer program product, where the computer program product includes a non-transitory computer readable storage medium storing a computer program operable to enable a computer to perform some or all of the steps described by the core network device in the above method embodiments. The computer program product may be a software package.

The steps of the method or algorithms described in the embodiments of the present application may be implemented in hardware or implemented in a form of executing software instructions by a processor. The software instructions may be composed of corresponding software modules, which may be stored in a Random Access Memory (RAM), a flash memory, a Read Only Memory (ROM), an Erasable Programmable ROM (EPROM), an Electrically Erasable Programmable Read-only Memory (EEPROM), a register, a hard disk, a mobile hard disk, a Compact Disc Read-only Memory (CD-ROM), or any other form of storage medium known in the art. An exemplary storage medium is coupled to the processor to enable the processor to read information from and write information to the storage medium. The storage medium may also be a part of the processor. The processor and the storage medium may be located in an ASIC. In addition, the ASIC may be located in an access network device, a target core network device, or a core network device. The processor and the storage medium may also exist as discrete components in the access network device, the target core network device or the core network device.

Those skilled in the art should aware that in one or more of the above examples, the functions described in the embodiments of the present application may be implemented in whole or in part by software, hardware, firmware, or any combination thereof. When the functions are implemented using software, it may be implemented in whole or in part in the form of a computer program product. The computer program product includes one or more computer instructions. When the computer program instructions are loaded and executed on a computer, the processes or functions according to the embodiments of the present application are generated in whole or in part. The computer may be a general purpose computer, a special purpose computer, a computer network, or other programmable apparatus. The computer instruction may be stored in a computer readable storage medium or transmitted from one computer readable storage medium to another computer readable storage medium, for example, the computer instruction may be transmitted from one website site, computer, server or data center to another website site, computer, server or data center by wired (e.g., coaxial cable, optical fiber, Digital Subscriber Line (DSL)) or wireless (e.g., infrared, wireless, microwave, etc) manners. The computer readable storage medium may be any available medium that a computer can access or a data storage device such as a server, a data center, or the like that includes one or more available media integration. The usable medium may be a magnetic medium (e.g., floppy disk, hard disk, magnetic tape), an optical medium (e.g., Digital Video Disc (DVD)), or semiconductor medium (e.g., Solid State Disk (SSD)) or the like.

The specific embodiments described above have further explained the objects, technical solutions and beneficial effects of the embodiments of the present application in detail. It should be understood that the above is only the specific embodiments of the embodiments of the present application and is not intended to limit the protection scope of the embodiments of the present application. Any modification, equivalent substitution, improvement, etc. made on the basis of the technical solutions of the embodiments of the present application shall be included in the protection scope of the embodiments of the present application.

What is claimed is:

1. A service configuration method, comprising:
    sending, by a core network device, first configuration information to an access network device, the first configuration information being used to indicate one Quality of Service (QoS) resource type in a plurality of QoS resource types to be selected, and the one QoS resource type indicated by the first configuration information being used for the access network device to transmit a first service; and the plurality of QoS resource types comprising a Guaranteed Bit Rate (GBR) type, a Non-Guaranteed Bit Rate (Non-GBR) type and a delay critical Guaranteed Bit Rate (GBR) type;
    wherein after sending, by the core network device, the configuration information to the access network device, the method further comprises:
    receiving, by the core network device, feedback information sent by the access network device, the feedback information being used to indicate that the access network device does not support the one QoS resource type; and
    sending, by the core network device, second configuration information to the access network device according to the feedback information, the second configuration information being used to indicate other QoS resource types in the plurality of QoS resource types except the one QoS resource type, and said other QoS resource types indicated by the second configuration information being used for the access network device to transmit the first service.

2. The method according to claim 1, wherein before sending, by the core network device, the first configuration information to the access network device, the method further comprises:
    generating, by the core network device, the first configuration information according to a type table, the type table comprising an identification of each QoS resource type in the plurality of QoS resource types, and the first configuration information indicating the one QoS resource type by carrying an identification of the one QoS resource type.

3. The method according to claim 1, wherein the first configuration information comprises description information, the description information being used to describe the one QoS resource type.

4. The method according to claim 1, wherein the feedback information is further used to indicate at least one QoS resource type in the plurality of QoS resource types that is supported by the access network device; and said other QoS resource types belong to the QoS resource type in the at least one QoS resource type.

5. The method according to claim 1, wherein before sending, by the core network device, the first configuration information to the access network device, the method further comprises:
receiving, by the core network device, a request message sent by the access network device, the request message comprising at least one of a QoS flow, a QoS rule and a QoS identification associated with the one QoS resource type, and the request message being used to request the core network device to configure the one QoS resource type for the access network device.

6. A service configuration method, comprising:
receiving, by an access network device, first configuration information sent by a core network device, the first configuration information being used to indicate one Quality of Service (QoS) resource type in a plurality of QoS resource types to be selected, the one QoS resource type being recommended to the access network device to transmit a first service, and the plurality of QoS resource types comprising a Guaranteed Bit Rate (GBR) type, a Non-Guaranteed Bit Rate (Non-GBR) type and a delay critical Guaranteed Bit Rate (GBR) type; and
determining, by the access network device, the one QoS resource type according to the first configuration information;
wherein after determining, by the access network device, the one QoS resource type according to the first configuration information, the method further comprises:
sending, by the access network device, feedback information to the core network device, the feedback information being used to indicate that the access network device does not support the one QoS resource type;
receiving, by the access network device, second configuration information sent by the core network device, the second configuration information being used to indicate other QoS resource types in the plurality of QoS resource types except the one QoS resource type, and said other QoS resource types being recommended to the access network device to transmit the first service; and
determining, by the access network device, said other QoS resource types according to the second configuration information.

7. The method according to claim 6, wherein the determining, by the access network device, the one QoS resource type according to the first configuration information comprises:
determining that the first configuration information comprises an identification of the one QoS resource type, each QoS resource type in the plurality of QoS resource types having a respective identification; and
determining the one QoS resource type according to the identification of the one QoS resource type.

8. The method according to claim 6, wherein the first configuration information comprises description information, the description information being used to describe the one QoS resource type.

9. The method according to claim 6, wherein the feedback information is further used to indicate at least one QoS resource type in the plurality of QoS resource types that is supported by the access network device; and said other QoS resource types belong to the QoS resource type in the at least one QoS resource type.

10. The method according to claim 6, wherein before receiving, by the access network device, the first configuration information sent by the core network device, the method further comprises:
sending, by the access network device, a request message to the core network device, the request message comprising at least one of a QoS flow, a QoS rule and a QoS identification associated with the one QoS resource type, and the request message being used to request the core network device to configure the one QoS resource type for the access network device.

11. A core network device, comprising: a processor, a memory, a transceiver, and one or more programs stored in the memory and configured to be executed by the processor, wherein the programs comprise instructions for performing:
sending first configuration information to an access network device, the first configuration information being used to indicate one Quality of Service (QoS) resource type in a plurality of QoS resource types to be selected, and the one QoS resource type indicated by the first configuration information being used for the access network device to transmit a first service; and the plurality of QoS resource types comprising a Guaranteed Bit Rate (GBR) type, a Non-Guaranteed Bit Rate (Non-GBR) type and a delay critical Guaranteed Bit Rate (GBR) type;
wherein the programs further comprise instructions for performing:
receiving feedback information sent by the access network device, the feedback information being used to indicate that the access network device does not support the one QoS resource type; and
sending second configuration information to the access network device according to the feedback information, the second configuration information being used to indicate other QoS resource types in the plurality of QoS resource types except the one QoS resource type, and said other QoS resource types indicated by the second configuration information being used for the access network device to transmit the first service.

12. The core network device according to claim 11, wherein the programs further comprise instructions for performing:
generating the first configuration information according to a type table, the type table comprising an identification of each QoS resource type in the plurality of QoS resource types, and the first configuration information indicating the one QoS resource type by carrying an identification of the one QoS resource type.

13. The core network device according to claim 11, wherein the first configuration information comprises description information, the description information being used to describe the one QoS resource type.

14. The core network device according to claim 11, wherein the feedback information is further used to indicate at least one QoS resource type in the plurality of QoS resource types that is supported by the access network device; and said other QoS resource types belong to the QoS resource type in the at least one QoS resource type.

15. The core network device according to claim 11, wherein the programs further comprise instructions for performing:
receiving a request message sent by the access network device, the request message comprising at least one of a QoS flow, a QoS rule and a QoS identification associated with the one QoS resource type, and the request message being used to request the core network device to configure the one QoS resource type for the access network device.

16. An access network device, comprising: a processor, a memory, a communication interface, and one or more programs stored in the memory and configured to be executed by the processor, wherein the programs comprise instructions for performing:

receiving first configuration information sent by a core network device, the first configuration information being used to indicate one Quality of Service (QoS) resource type in a plurality of QoS resource types to be selected, the one QoS resource type being recommended to the access network device to transmit a first service, and the plurality of QoS resource types comprising a Guaranteed Bit Rate (GBR) type, a Non-Guaranteed Bit Rate (Non-GBR) type and a delay critical Guaranteed Bit Rate (GBR) type; and determining the one QoS resource type according to the first configuration information;

wherein the programs further comprise instructions for performing:

sending feedback information to the core network device, the feedback information being used to indicate that the access network device does not support the one QoS resource type;

receiving second configuration information sent by the core network device, the second configuration information being used to indicate other QoS resource types in the plurality of QoS resource types except the one QoS resource type, and said other QoS resource types being recommended to the access network device to transmit the first service; and determining said other QoS resource types according to the second configuration information.

17. The access network device according to claim 16, wherein the programs further comprise instructions for performing:

determining that the first configuration information comprises an identification of the one QoS resource type, each QoS resource type in the plurality of QoS resource types having a respective identification; and determining the one QoS resource type according to the identification of the one QoS resource type.

18. The access network device according to claim 16, wherein the first configuration information comprises description information, the description information being used to describe the one QoS resource type.

19. The access network device according to claim 16, wherein the feedback information is further used to indicate at least one QoS resource type in the plurality of QoS resource types that is supported by the access network device; and said other QoS resource types belong to the QoS resource type in the at least one QoS resource type.

20. The access network device according to claim 16, wherein the programs further comprise instructions for performing:

sending a request message to the core network device, the request message comprising at least one of a QoS flow, a QoS rule and a QoS identification associated with the one QoS resource type, and the request message being used to request the core network device to configure the one QoS resource type for the access network device.

* * * * *